(No Model.)
W. H. FULLER.
PHOTOGRAPHIC CAMERA.
No. 407,587. Patented July 23, 1889.
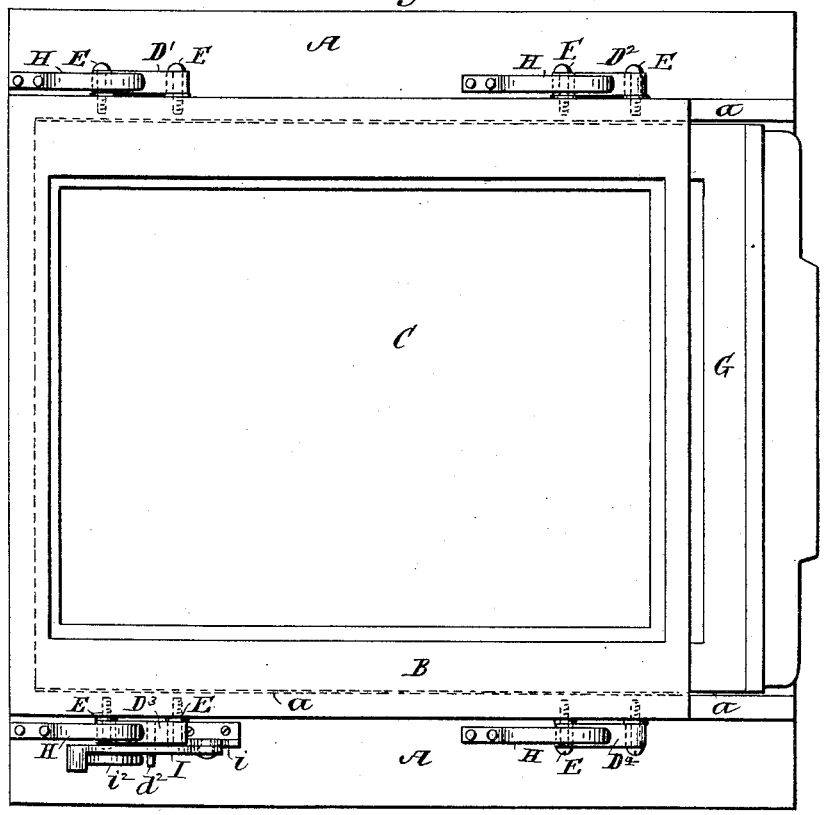
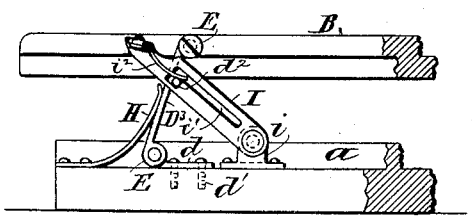
Witnesses
William H. Robinson
C. R. Ferguson
Inventor
Willard H. Fuller
By his attorneys
Gifford & Brown

UNITED STATES PATENT OFFICE.

WILLARD H. FULLER, OF PASSAIC, NEW JERSEY, ASSIGNOR TO THE SCOVILL MANUFACTURING COMPANY, OF NEW YORK, N. Y.

PHOTOGRAPHIC CAMERA.

SPECIFICATION forming part of Letters Patent No. 407,587, dated July 23, 1889.

Application filed December 24, 1888. Serial No. 294,453. (No model.)

*To all whom it may concern:*

Be it known that I, WILLARD H. FULLER, of Passaic, in the county of Passaic and State of New Jersey, have invented a certain new and useful Improvement in Photographic Cameras, of which the following is a specification.

My improvement relates to photographic cameras of the kind which are provided with a ground-glass frame connected adjustably to the camera-back or back-frame so that such ground-glass frame may be moved backwardly to permit of the introduction of a plate-holder in front of it.

My present improvement consists in the combination, with a ground-glass frame adjustably connected to the back or back-frame of a camera, of a detent for retaining said ground-glass frame in its rearmost position when adjusted into the same.

In the accompanying drawings, Figure 1 is a rear view of a camera-back or back-frame, a ground-glass frame, means connecting the ground-glass frame adjustably to the camera-back or back-frame, and a detent embodying my improvement. Fig. 2 is a bottom view of the same. Fig. 3 is a bottom view of a portion of the parts shown in Fig. 2 and illustrating a slight modification.

Similar letters of reference designate corresponding parts in all the figures.

A designates the back or back-frame of a camera. In it is an opening which, in the present instance, is of rectangular form.

B designates the ground-glass frame. This is of rectangular form, and is provided with a rectangular piece of ground glass C. The ground-glass frame B has pivotally connected to it links D' D² D³ D⁴, which are also pivotally connected to the back-frame A of the camera. As shown in Figs. 1 and 2, these links are formed of strips of metal bent flatwise at the ends to form loops or eyes. Screws E pass through these eyes and extend into the top and bottom surfaces of a projection $a$ on the camera-back frame and into the top and bottom surfaces of the ground-glass frame. The heads of these screws retain the links in place.

In Fig. 3 I have illustrated that the links may be secured to the rear surface of the camera-back frame by having their forward ends pivotally connected to leaves $d$, which bear against the rear surface of the camera-back frame, and are secured thereto by screws or like devices $d'$, passing through said leaves and extending forwardly into the camera-back frame.

In Figs. 1 and 2 I have shown a plate-holder G as fitted between the ground-glass frame B and the camera-back frame A, opposite the opening in the latter. This plate-holder is of ordinary rectangular form. It will be observed that the links D' D² D³ D⁴ have combined with them springs H, which are fastened to the rear surface of the camera-back frame by bolts or screws and bear upon the links. They serve to swing the links in such direction as to force the ground-glass frame B toward the camera-back frame and against the latter when nothing intervenes to prevent this. When the plate-holder is in place, these springs, acting through the links and the ground-glass frame, force and hold the plate-holder tightly against the rear surface of the camera-back frame.

I designates a lever which is pivotally connected to the camera. In the present instance it is pivotally connected to a stand or bracket $i$, that is secured by pins or screws to the rear surface of the camera-back frame. This lever is longitudinally slotted. Its slot $i'$ receives a pin $d^2$ projecting from one of the links, in the present instance the link D³. At the rear end the slot $i'$ has a transverse extension. The lever is provided with a spring $i^2$, which is here shown as a strip of metal fastened at one end to the handle of the lever and extending close to the rear end of the slotted portion of the lever.

Whenever the ground-glass frame is pulled backwardly far enough for the pin $d^2$ of the link $d^3$ to move into a position opposite the transversely-extending end portion of the slot $i'$ of the lever I, the spring $i^2$ of the lever pressing against this pin $d^2$ will swing the lever rearwardly, so that the transverse extension at the rear end of the slot in the lever will fit over the said pin $d^2$. The spring $i^2$ will prevent the lever from swinging forwardly. The transversely-extending portion of the slot in the lever will therefore operate so as to enable the lever to act as a stop or detent, holding the ground-glass frame in its rearmost position.

While the ground-glass frame is held in its rearmost position, a plate-holder may be inserted or removed without requiring the photographer to use both hands. When this has been done, the ground-glass frame may be released by a slight forward pressure on the lever sufficient to swing the lever far enough to move the transverse extension of its slot beyond the pin $d^2$ of the link $D^3$, whereupon the springs H will force the ground-glass frame forwardly as far as it can go.

What I claim as my invention, and desire to secure by Letters Patent, is—

1. The combination, with a camera-back or back-frame and a ground-glass frame, of links having pivotal connection with said frames, springs bearing on each of said links, and a detent adapted to hold the ground-glass frame in a rearward position against the actions of the springs, whereby a plate-holder may be inserted or removed, substantially as specified.

2. The combination, with a camera-back or back-frame, of a ground-glass frame adjustably connected thereto, a pin moving with the ground-glass frame, a detent consisting of a lever having a longitudinal slot terminating in a transverse extension and receiving said pin, and a spring carried by the lever, substantially as specified.

3. The combination, with a camera-back or back-frame and a ground-glass frame, of links, and screws extending vertically through the links and into the top and bottom surfaces of the said back or back-frame and ground-glass frame, and a swinging detent securing the ground-glass frame in its rearward position, substantially as specified.

WILLARD H. FULLER.

Witnesses:
H. LITTLEJOHN,
JOS. BARTON.